(12) United States Patent
Hidalgo et al.

(10) Patent No.: US 7,619,045 B2
(45) Date of Patent: Nov. 17, 2009

(54) WATER-SOLUBLE OR WATER-DISPERSIBLE ACRYLIC DISPERSANTS OBTAINED BY CONTROLLED RADICAL POLYMERIZATION

(75) Inventors: Manuel Hidalgo, Brignais (FR);
Stephanie Magnet, Morlanne (FR);
Olivier Guerret, La Tour de Salvagny (FR)

(73) Assignee: Arkema France, Colombes (FR)

( * ) Notice: Subject to any disclaimer, the term of this patent is extended or adjusted under 35 U.S.C. 154(b) by 581 days.

(21) Appl. No.: 11/270,751

(22) Filed: Nov. 9, 2005

(65) Prior Publication Data
US 2006/0111479 A1    May 25, 2006

Related U.S. Application Data

(60) Provisional application No. 60/647,216, filed on Jan. 26, 2005.

(30) Foreign Application Priority Data
Nov. 9, 2004    (FR) .................................... 04 11945

(51) Int. Cl.
*C08F 2/10* (2006.01)
(52) U.S. Cl. .................... 526/81; 526/220; 526/320; 526/329.5; 526/329.6; 526/333; 526/307.5; 526/317.1; 526/318; 524/5; 524/558; 524/556; 524/560
(58) Field of Classification Search .............. 524/5
See application file for complete search history.

(56) References Cited

U.S. PATENT DOCUMENTS

| 4,581,429 | A  | * | 4/1986  | Solomon et al. ............ 526/220 |
| 6,376,581 | B1 | * | 4/2002  | Tanaka et al. ................ 524/5 |
| 6,548,589 | B2 | * | 4/2003  | Widmer et al. .............. 524/457 |
| 6,673,885 | B1 | * | 1/2004  | Shibata et al. ......... 526/318.41 |
| 7,288,585 | B2 | * | 10/2007 | Moad et al. .................. 524/315 |
| 2006/0142511 | A1 | * | 6/2006 | Couturier et al. ............ 526/217 |

FOREIGN PATENT DOCUMENTS

WO    WO 98/07758    *  2/1998

OTHER PUBLICATIONS http://www.galleries.com/minerals/sulfates/ gypsum/gypsum.htm.*
http://www.ingentaconnect.com/content/k1u/glac/2003/00000060/ F0020011/00487272.*

* cited by examiner

*Primary Examiner*—David Wu
*Assistant Examiner*—Vu Nguyen
(74) *Attorney, Agent, or Firm*—Thomas F. Roland

(57) ABSTRACT

The present invention relates to a process for the preparation in aqueous solution of water-soluble acrylic polymers or for the preparation in aqueous dispersion of water-dispersible acrylic co-polymers, polymerised from, the total being 100 mol %:
 a) 5 to 70 mol % of one or more monomer(s) (A) which are (alkoxy)polyalkylene glycol (meth)acrylates and/or ((alkoxy)polyalkylene glycol)(meth)acrylamides;
 b) 5 to 95 mol % of one or more unsaturated carboxylic monomer(s) (B); and
 c) 0 to 85 mol % of one or more hydrophobic monomer(s) (C) which are water insoluble, in the absence of a chain-transfer agent, and in the presence of a sufficient amount of a water-soluble alkoxyamine, until a conversion of at least 90% by weight of the monomers (A), (B) and (C) is obtained. The polymer has a polydispersity index $\overline{Mw}/\overline{Mn}$ advantageously <2 and an $\overline{Mn}$ of between 10 000 g/mol and 50 000 g/mol. Alternately, only some of the monomer (>50%) is converted by the alkoxyamine and the polymerization is completed by a conventional radical initiator. The polymer obtained has a polydispersity index $\overline{Mw}/\overline{Mn}$<6, advantageously <5, preferably <4, and an $\overline{Mw}$ of between 10 000 g/mol and 500 000 g/mol and advantageously between 30 000 and 150 000 g/mol.

32 Claims, No Drawings

WATER-SOLUBLE OR WATER-DISPERSIBLE ACRYLIC DISPERSANTS OBTAINED BY CONTROLLED RADICAL POLYMERIZATION

This application claims benefit, under U.S.C. §119(a) of French National Application Number FR 04.11945, filed Nov. 9, 2004; and also claims benefit, under U.S.C. §119(e) of U.S. provisional application 60/647,216, filed Jan. 26, 2005.

FIELD OF THE INVENTION

The present invention relates to water-soluble or water-dispersible acrylic dispersants obtained by controlled radical polymerization. It relates more particularly to a specific process in an aqueous medium for the synthesis of dispersing polymers for mineral particles, such as cement, sand and mineral aggregates, to the dispersing polymers obtained and to the use of these dispersants in formulations based on hydraulic binders, such as cement, mortar or concrete, or in other formulations comprising mineral particles, such as sand or mineral aggregates. The process for the synthesis in an aqueous medium by radical polymerization forming one of the subject-matters of the invention exhibits the huge advantage of making it possible to obtain dispersing copolymers with a distribution in molecular masses which is better controlled than when conventional processes are used, this being the case without the help of chain-transfer agents which are furthermore virtually indispensable in any conventional process for the synthesis of dispersants by polymerization in an aqueous medium. Furthermore, the Applicant Company has found that the polymer dispersants or plasticizers manufactured using the preparation process forming one of the subject-matters of the invention have superior performances to those obtained with products existing commercially. Molecular mass in this application, where not indicated, has the units of g/mol.

BACKGROUND OF THE INVENTION

As regards dispersants, also known as plasticizers, for mineral particles and in particular for hydraulic binders, such as cement, mortar or concrete, there exists a category of products possessing noteworthy performances in terms of fluidification of the mixture based on hydraulic binder, that is to say that they make possible good fluidification of the mixture with relatively low proportions of dispersant. Due to these good performances, these products make it possible to prepare mixtures of good fluidity with a reduced contribution of water, hence the term employed in the trade, of "high-range water reducers", to describe them. This category of products is also known as that of the "superplasticizers" and it essentially comprises two types of families of commercial products, depending on their chemical natures. Numerous works, such as the book by V. S. Ramachandran, V. M. Malhotra, C. Jolicoeur and N. Spiratos, entitled *Superplasticizers: Properties and Applications in Concrete*, published by the Materials Technology Laboratory, CANMET; Natural Resources Canada, copyright Minister of Public Works and Government Services, Canada, 1998, describe these two families of products as being, on the one hand, that of sulphonated polymers and, on the other hand, that of polycarboxylates. The family of the sulphonated polymers includes polynaphthalene sulphonates and polymelamine sulphonates, also known as the condensation products of formaldehyde with naphthalene sulphonate and melamine sulphonate, respectively. There is a tendency these days for these products to be replaced by the second main family of commercial superplasticizers, the polycarboxylates, the performances of which are much superior in the majority of cases.

In most cases, the term "polycarboxylates" refers to "comb" copolymers, in the molecular structure of which it is possible to distinguish:
 a main hydrocarbon chain comprising ionizable groups (of the type of those resulting from the polymerization or copolymerization of acrylic and/or methacrylic acid, maleic and/or fumaric acid, and the like) and
 uncharged side polymer chains comprising polyethylene oxide blocks, inter alia or exclusively.

Two main methods exist which make possible the synthesis of these molecules of copolymers comprising side chains or "comb" copolymers.

The first method, which is the most direct for a person skilled in the art, consists of the copolymerization of monomers, for example of acrylic or methacrylic type, of at least two different types: those, acids, comprising ionizable groups which give rise in a basic medium to negative charges on the main chain, and those, to which are attached, via chemical functional groups, such as esters or amides, oxyethylene chains which give rise to side chains. It is this first method which is used in the process of the invention.

The second method, in two stages, consists of the synthesis, first, of the main chain comprising the ionizable groups and of the subsequent attachment, to this main chain, of the side chains via chemical reactions between functional groups of the main chain (such as acid groups) and functional groups associated with the side chains to be attached, such as alcohol groups (esterification with the acids of the main chain), amine groups (amidation with the acids of the main chain) or others.

The preparation of the "comb" copolymers by the first method described above is generally carried out by a radical copolymerization reaction in a predominantly aqueous medium, according to methods well known to a person skilled in the art. In addition to the choice of the monomers to be copolymerized and their relative composition, a very important aspect of these copolymerizations is the control of the average molecular masses and of the distribution of the molecular masses, as these two variables are intimately related to the applicational properties of the products obtained. Thus it is, for example, that U.S. Pat. No. 6,376,581 discloses the method for the production of a cement dispersant composed of polymers of polycarboxylic acid type: a) the weight-average molecular masses of which lie between 10 000 and 500 000 g/mol (with respect to polyethylene glycol standards and according to a method of measurement by gel permeation chromatography or GPC) and b) the difference between the weight-average molecular mass and the molecular mass at the tip of the peak ($\overline{Mw}-Mp$) of which is between 0 and 8000. The difference $\overline{Mw}-Mp$ of less than or equal to 8000 reflects a degree of narrowness in the distribution of the molecular masses which is described as necessary for the good performances of the dispersants claimed in U.S. Pat. No. 6,376,581. In point of fact, U.S. Pat. No. 6,376,581 discloses polymers which are prepared by a conventional radical polymerization process, the tendency of which is to naturally result in relatively broad molecular mass distributions, this tendency increasing as the predominant molecular masses (or molecular masses at the tip of the distribution of the masses, Mp) desired increase.

Furthermore, it is well known to a person skilled in the art that the control of the molecular masses of the polymers manufactured by conventional radical polymerization methods in an aqueous medium, such as that disclosed in U.S. Pat. No. 6,376,681 and in other patent applications using this type of polymerization, such as, for example, Patent Application PCT No. WO 01/74736 A1 or European Patent Application No. EP 1 136 507 A1, requires the use of chemical agents or systems for controlling the molecular masses, such as chain-transfer agents, the role of which is to limit the value of the average molecular mass of the polymers obtained, so as to manufacture polymers of use in the applications of the dispersion of mineral particles and more particularly cement particles. Application EP 1 136 507 A1, for example, situates the region of preference in terms of average molecular mass for dispersants for cement between 1000 and 30 000 Daltons (or g/mol) for the number-average molecular mass or $\overline{Mn}$. The text of this patent application explains that, when the average molecular masses are too high (for example $\overline{Mn}$>30 000 g/mol), the performances in terms of fluidification of the dispersing polymers are not optimum. It is also explained therein that, when the average molecular masses are too low, the dispersing or plasticizing power of the polymers is seen to be reduced, just like the property which some of these polymers have of keeping cement-based mixtures fluid for a period of time which ranges from a few fractions of an hour to a few hours. However, in this patent application, the polymerization is carried out with conventional radical initiators and with chain-transfer agents.

The limitation of the molecular masses to average values compatible with the good performances of the polymers as dispersants and in particular as dispersants for cement-based preparations, when the processes or methods for the preparation of these polymers involve conventional radical polymerization in an aqueous medium, is thus generally obtained by the use of chain-transfer agents well known in radical polymerization. Apart from the disadvantage of having to add at least one additional ingredient during the polymerization stages, some of the most effective transfer agents in an aqueous medium have other disadvantages, which can be their difficulty of handling due to their toxic or odorous nature. Still so as to limit the average molecular masses of the polymers obtained in an aqueous medium, other strategies based on the actual nature of the conventional radical polymerization can be employed in combination with (or in substitution for) the use of chain-transfer agents. These strategies, which are not devoid of disadvantages, can, for example, be the use of the highest possible polymerization temperatures (this having a tendency to naturally limit the molecular masses by relative modification of the values of the kinetic termination and chain-propagation constants) but this is often expensive in terms of energy and reduces the safety margins in the event of losses of control of the polymerization (exothermic reaction). The use of significant amounts of radical polymerization initiators is also a means of attempting to limit the molecular masses but it can prove to be costly and can also reduce the safety margins in the event of losses of control of the exothermic polymerization reaction. Other means of limiting the molecular masses can consist in operating in a fairly dilute medium or in halting the polymerization reactions at incomplete conversions of monomers, in order to penalize the formation of high molecular masses at the end of the reaction, or in using processes for the semicontinuous addition of the monomers with fairly lengthy addition times; however, these strategies have the disadvantage of impacting the productivity of the preparation method and, for this reason, of increasing the overall production cost for the polymer dispersants.

Furthermore, the natural tendency of the conventional radical polymerization in a concentrated aqueous medium to give molecular mass distributions which increase in width as the targeted average molecular masses increase is one of the main reasons which force a person skilled in the art to attempt to restrict the average molecular masses by the use of agents for controlling masses and/or of other convergent strategies, such as those mentioned in the preceding paragraph. In other words, the conventional radical polymerization in an aqueous medium does not make it possible to obtain molecules having good dispersing properties with, at the same time, relatively high average molecular masses (typically having $\overline{Mn}$ values of greater than 25 000) and low values for the width of the distribution of the molecular masses.

It has now been found that it is possible to prepare, in aqueous solution or in aqueous dispersion, polymers of polycarboxylic acid type by controlled radical polymerization without the use of a chain-transfer agent and that a polydispersity index $\overline{Mw}/\overline{Mn}$ advantageously <2 and an $\overline{Mn}$ of between 10 000 and 50 000 are obtained.

It has also been found that it is possible to prepare, in aqueous solution or dispersion, polymers of polycarboxylic acid type by controlled radical polymerization without the use of a chain-transfer agent, in order to convert at least 60% of the monomers, followed by a conventional radical polymerization, and that a polydispersity index $\overline{Mw}/\overline{Mn}$<6, advantageously <5, preferably <4, and an $\overline{Mw}$ of between 10 000 and 500 000 and advantageously between 30 000 and 150 000 are obtained. Advantageously, at the end of the controlled radical polymerization, a polydispersity index $\overline{Mw}/\overline{Mn}$<2 and an $\overline{Mn}$ of between 10 000 and 50 000 are obtained.

The polymers obtained are of use as dispersants for mineral particles, such as cement. They are also of use as plasticizing admixtures or in mixture with other polymers for compositions formed of mineral particles and more particularly based on cement, such as, for example, cement grouts, mortars and concretes or as plasticizing admixtures in cosmetic formulations containing charges and/or pigments insolubles in water and cosmetic solvents and oils or also in ceramic compositions. The products of the invention have better properties than those of the prior art. The polymers of the invention are used in aqueous solution or dispersion and advantageously in the form of the solution or dispersion in which they were synthesized or of the diluted materials prepared from this solution or dispersion. They can also be used in the powder form after drying, for example by atomization, the solution or dispersion in which they were synthesized. For the use in cement or as plasticizing admixtures for compositions formed of mineral particles, it is necessary that the least possible amount of unpolymerized monomers remain in the solution. The polymers obtained are also optionally of use as a mixture with other products or other polymers in cosmetic formulations or paint or ceramic compositions.

SUMMARY OF THE INVENTION

According to a first form, the present invention relates to a process for the preparation in aqueous solution or dispersion of water-soluble or water-dispersible acrylic polymers in which the following are copolymerized, the total of the comonomers being 100 mol %:

5 to 70%, advantageously 5 to 50%, of monomer(s) (A) of the family of the (alkoxy)polyalkylene glycol (meth)acrylates and/or of the family of the ((alkoxy)polyalkylene glycol)(meth)acrylamides, 5 to 95%, advantageously 20 to 95%, of unsaturated carboxylic monomer(s) (B), 0 to 85%, advantageously 0 to 65%, of hydrophobic monomer(s) (C) which is (are) not very soluble in water, in the absence of a chain-transfer agent, in the presence of a sufficient amount of a water-soluble alkoxyamine, until a conversion of at least 90%, advantageously 93%, by weight of the monomers (A), (B) and (C) is obtained.

The alkoxyamine acts as initiator and controller of the polymerization, hence the name of controlled radical polymerization.

These polymers have a polydispersity index $\overline{Mw}/\overline{Mn}$ advantageously <2 and an $\overline{Mn}$ of between 10 000 and 50 000.

The invention also relates to the aqueous solution or dispersion of water-soluble or water-dispersible acrylic polymer obtained by the above process, and also to any diluted material prepared from this solution or dispersion and to any concentrated material also prepared from this solution or dispersion, including that which involves drying until the polymer (which was present in the solution or dispersion) is obtained in the form of a dry or wet powder.

It would not be departing from the scope of the invention if insignificant amounts of a chain-transfer agent were added or if one of the monomers (A), (B) and (C) had chain-transfer functional groups or generated a chain-transfer agent in insignificant amounts.

These polymers are also novel products in themselves, whatever their process of preparation. Thus, the present invention relates to an aqueous solution of water-soluble acrylic polymer or a dispersion of water-dispersible acrylic polymer, comprising, the total of the comonomers being 100 mol %:

5 to 70%, advantageously 5 to 50%, of monomer(s) (A) of the family of the (alkoxy)polyalkylene glycol (meth)acrylates and/or of the family of the ((alkoxy)polyalkylene glycol) (meth)acrylamides, 5 to 95%, advantageously 20 to 95%, of unsaturated carboxylic monomer(s) (B), 0 to 85%, advantageously 0 to 65%, of hydrophobic monomer(s) (C) which is (are) not very soluble in water, the said polymer having a polydispersity index $\overline{Mw}/\overline{Mn}$ advantageously <2 and an $\overline{Mn}$ of between 10 000 and 50 000.

The invention also relates to any diluted material prepared from this solution or dispersion and to any concentrated material also prepared from this solution or dispersion, including that which involves drying until the polymer (which was present in the solution or dispersion) is obtained in the form of a dry or wet powder.

According to a second form, the present invention relates to a process for the preparation in aqueous solution of water-soluble acrylic polymers or a process for the preparation in aqueous dispersion of water-dispersible acrylic polymer, process in which the following are copolymerized, the total of the comonomers being 100 mol %:

5 to 70%, advantageously 5 to 50%, of monomer(s) (A) of the family of the (alkoxy)polyalkylene glycol (meth)acrylates and/or of the family of the ((alkoxy)polyalkylene glycol)(meth)acrylamides, 5 to 95%, advantageously 20 to 95%, of unsaturated carboxylic monomer(s) (B), 0 to 85%, advantageously 0 to 65%, of hydrophobic monomer(s) (C) which is (are) not very soluble in water, in the absence of a chain-transfer agent, in the presence of a sufficient amount of a water-soluble alkoxyamine, until a conversion of at least 50%, advantageously 60%, by weight of the monomers (A), (B) and (C) is obtained, then the polymerization is terminated in the presence of a conventional radical initiator, optionally in the presence of a chain-transfer agent, until a conversion of at least 90%, advantageously 93%, by weight of the monomers (A), (B) and (C) is obtained.

The invention also relates to the aqueous solution or dispersion of water-soluble acrylic polymer obtained by the above process, and also to any diluted material prepared from this solution or dispersion and to any concentrated material also prepared from this solution or dispersion, including that which involves drying until the polymer (which was present in the solution or dispersion) is obtained in the form of a dry or wet powder.

The acrylic polymer in aqueous solution or dispersion has a polydispersity index $\overline{Mw}/\overline{Mn}$<6, advantageously <5, preferably <4, and an $\overline{Mw}$ of between 10 000 and 500 000 and advantageously between 30 000 and 150 000. Advantageously, at the end of the controlled radical polymerization, a polydispersity index $\overline{Mw}/\overline{Mn}$<2 and an $\overline{Mn}$ of between 10 000 and 50 000 are obtained.

It would not be departing from the scope of the invention if insignificant amounts of a chain-transfer agent were added or if one of the monomers (A), (B) and (C) had chain-transfer functional groups or generated a chain-transfer agent in insignificant amounts.

These polymers are also novel products in themselves, whatever their process of preparation. Thus, the present invention relates to an aqueous solution or dispersion of water-soluble or water-dispersible acrylic polymer comprising, the total of the comonomers being 100 mol %:

5 to 70%, advantageously 5 to 50%, of monomer(s) (A) of the family of the (alkoxy)polyalkylene glycol (meth)acrylates and/or of the family of the ((alkoxy)polyalkylene glycol) (meth)acrylamides, 5 to 95%, advantageously 20 to 95%, of unsaturated carboxylic monomer(s) (B), 0 to 85%, advantageously 0 to 65%, of hydrophobic monomer(s) (C) which is (are) not very soluble in water, the said polymer having a polydispersity index $\overline{Mw}/\overline{Mn}$<6, advantageously <5, preferably <4, and an $\overline{Mw}$ of between 10 000 and 500 000 and advantageously between 30 000 and 150 000.

The invention also relates to any diluted material prepared from this solution or dispersion and to any concentrated material also prepared from this solution or dispersion, including that which involves drying until the polymer (which was present in the solution or dispersion) is obtained in the form of a dry or wet powder.

The polymers of the invention are used in aqueous solution or dispersion and advantageously in the form of the solution or dispersion in which they were synthesized or of the diluted materials obtained from this solution or dispersion. The polymers of the invention can also be used in the powder form after drying, for example by atomization, the solution or dispersion in which they were synthesized.

The invention relates to the use of these polymers as dispersants for mineral particles, such as cement.

The invention also relates to the use of these polymers as plasticizing admixtures for compositions formed of mineral particles and more particularly cement-based compositions, such as, for example, cement grouts, mortars and concretes. The invention also relates to the use of these polymers in mixture with other polymers for example for liquefying thereof, in compositions containing mineral particles and more particularly cement-based compositions, such as, for example, cement grouts, mortars and concretes. The invention also relates to the cements comprising these dispersants.

The polymers of the invention are also advantageously of use as a mixture with other products or other polymers for example in cosmetic or paint or ceramic formulations (or compositions). The invention also relates to these cosmetic or paint or ceramic compositions.

The invention also relates to the finished items obtained from the above compositions.

The masses $\overline{Mw}$ and $\overline{Mn}$ of the present invention are expressed as polyethylene glycol equivalent and are measured by Steric Exclusion Chromatography, SEC, a technique also known under the name of GPC, the abbreviation of Gel Permeation Chromatography. The polymers of the invention are characterized in terms of the molecular masses by passing dilute solutions comprising them through an "aqueous" SEC sequence comprising:

a set of columns, for example 300×7 TSK PW XL columns placed in the order: 70×7 head precolumn of 2500 type, then 6000/2500/3000/4000 sequence in this order, a pump, for example Shimadzu LC 10, detectors, such as, for example, a differential refractometric detector (for example, a Varian RI 4 with cell thermostatically controlled at 35° C.) and/or a UV spectroscopic detector (for example, a Varian UV 2050), a Pelletier effect oven, such as, for example, a Jetstream from Jasco, an injection valve, for example Rheodyne.

The distribution of the molecular masses is thus obtained according to the separating power of the system of columns in terms of retention times in the columns and, in order to obtain values of the molecular masses, calibration is carried out with, generally, polyethylene glycol standards so that the average molecular masses will be expressed as polyethylene glycol equivalent.

In this text, the terms "polymer" and "copolymer" are used indiscriminately to refer to the dispersants of the invention.

DETAILED DESCRIPTION OF THE INVENTION

The first form of the invention is first described.

As regards to the monomers (A), mention may be made of methoxypolyethylene glycol acrylates and methacrylates, (methoxypolyethylene glycol)acrylamides and -methacrylamides, methoxypoly(propylene-block-ethylene) glycol acrylates and methacrylates, (methoxypoly(propylene-block-ethylene) glycol)acrylamides and -methacrylamides, ethoxypolyethylene glycol acrylates and methacrylates, (ethoxypolyethylene glycol)acrylamides and -methacrylamides, ethoxypoly(propylene-block-ethylene) glycol acrylates and methacrylates and (ethoxypoly(propylene-block-ethylene) glycol)acrylamides and -methacrylamides. The total length of the polyalkylene glycol side chain is advantageously such that the average molecular mass $\overline{Mn}$ of this side chain is between 350 and 10 000 g/mol and preferably between 1000 and 6000 g/mol. Preference is given, among these monomers, to methoxypolyethylene glycol acrylate and methacrylate with a polyethylene glycol side chain with a number-average molar mass of between 900 and 5100 and more preferably with a number-average molar mass of between 1800 and 2200.

As regards the monomers (B), mention may be made, by way of examples, of acrylic, methacrylic and itaconic acids, as well as maleic and fumaric anhydrides and acrylic and methacrylic anhydrides. Acrylic acid and methacrylic acid are preferred.

As regards the monomers (C), mention may be made, by way of examples, of acrylic and methacrylic esters and styrene or vinyl monomers. Alkyl methacrylates are preferred.

As regards the polymerization, the process for the synthesis of the copolymers of the invention is a process employing the Controlled Radical Polymerization technique. Mention may be made, by way of example of alkoxyamine, of that disclosed in document WO 2004/014926, the nitroxide entity of which acts as control agent for the polymerization. The alkoxyamine used is advantageously 2-methyl-2-[N-tert-butyl-N-(diethoxy-phosphoryl-2,2-dimethylpropyl)aminoxy] propionic acid and its metal and ammoniacal salts, including those of sodium, potassium and ammonium. This alkoxyamine will be denoted subsequently under the abbreviation MAMA. The polymerization medium is water or mixtures of solvents based on water.

The mixture of monomers can be introduced all at once before the initiation of the polymerization reaction (batch mode) or again according to a semi-continuous addition mode, which consists of the gradual introduction of the monomers into the polymerization reactor and, when the polymerization reaction has been initiated, of a predetermined addition time which is generally between a few minutes and several hours. The polymerization reaction is initiated by virtue of the alkoxyamine (MAMA). The alkoxyamine MAMA is a fine white-coloured powder which has to be dissolved in water by neutralization of the acid group with a base and preferably with a strong base. The neutralization of the MAMA can be carried out in the polymerization reactor comprising an aqueous vessel heel, before the addition of the monomers, or again aqueous solutions of neutralized MAMA can be prepared separately in order to be used in a single addition to the reactor at the beginning of the polymerization or else in delayed additions during the polymerization or else alternatively in addition of semi-continuous type during the polymerization and in parallel with the addition of monomers, when a method of addition of the monomers of semi-continuous type is chosen. The latter method of addition of the MAMA of semi-continuous type and in parallel with addition of the monomers is such that the ratio of the amount of monomers to the amount of MAMA which enter the polymerization reactor is kept constant.

The polymerization temperature is between 25 and 100° C. and preferably between 40 and 80° C. throughout the duration of the controlled radical polymerization, which generally ranges from 2 to 8 hours.

The dispersants or plasticizers obtained according to the process of the invention are generally provided in the form of aqueous solutions or dispersions comprising a level of solid measured according to methods of evaporation of the volatile entities well known to a person skilled in the art. Advantageously, this level is between 10 and 60% and preferably between 20 and 50%. The difference in weight between the weight of the aqueous solution or dispersion and that of the dry residue after evaporation determines a percentage of dry extract, which is a necessary characteristic in ascertaining the dosage of effective dispersing material used in the compositions based on mineral particles when the aqueous plasticizing solution or dispersion is used as is. The viscosity of the aqueous plasticizing solution or dispersion constitutes a characteristic which can be measured using rheometers, such as the Brookfield viscometer, well known to a person skilled in the art. This viscosity depends in a rather complex way on the degree of conversion of the monomers to polymer in the aqueous solution or dispersion and on the molecular masses of the polymer molecules in the aqueous solution or dispersion. Other techniques, such as nuclear magnetic resonance (NMR) or chromatographic separation techniques, can be used to estimate the degree of conversion of the monomers to polymer. The low volatility of some monomers capable of being used for the synthesis of the dispersants of the invention renders imprecise the estimation of the conversion of the monomers to polymer by the dry extract of the aqueous solution or dispersion.

The second form of the invention is now described. The essential difference from the first form is that, instead of carrying out the entire conversion (polymerization) of the monomers by controlled radical polymerization, the polymerization is begun under controlled radical polymerization conditions and is terminated under conventional radical polymerization conditions (i.e. with peroxides, persulphates, azo compounds or their equivalents). The monomers which are polymerized under conventional radical conditions may already be present during the controlled radical polymerization and were not converted or else they are added to the aqueous solution or dispersion comprising the portion of the dispersant already prepared by controlled radical polymerization or alternatively a combination of these possibilities is employed. To carry out this conventional radical polymerization, conventional radical generators well known to a person skilled in the art and frequently used during conventional radical polymerization reactions in an aqueous medium are added to the aqueous solution or dispersion comprising the portion of the dispersant already prepared by controlled radical polymerization. Mention may be made, among these radical generators, not exclusively, of metal and ammoniacal salts of persulphate, such as sodium persulphate, potassium persulphate and ammonium persulphate, water-soluble azo initiators, such as 2,2'-azobis(2-amidinopropane) dihydrochloride and metal and ammoniacal salts of 4,4'-azobis(4-cyanopentanoic acid), redox couples, such as the (sodium, potassium or ammonium) persulphate/vitamin C couple or the sodium or potassium metabisulphite/persulphate couple or the hydrogen peroxide/ferrous ion salts couple or the tert-butyl hydroperoxide/sodium sulphoxylate couple, and any other possible oxidizing agent(s)/reducing agent(s) combination. When there is a large amount of residual monomers to be converted after the controlled radical polymerization reaction, the use of conventional radical polymerization initiators will result in aqueous solutions or dispersions formed of a blend of copolymers of different origins, those obtained by conventional radical polymerization and those obtained by controlled radical polymerization. For this conventional radical polymerization stage, the use is not ruled out of chain-transfer agents, such as those used conventionally in conventional radical polymerization in an aqueous medium, even if, advantageously, they are not used. Mention may be made, among the transfer agents used in conventional radical polymerizations, not exclusively, of isopropanol or water-soluble mercaptans, such as thioglycolic acid or mercaptopropionic acid or mercaptoethanol. The Applicant Company has found that these blends of copolymers of different origins can have good dispersing or plasticizing properties for mineral particles, despite overall distributions of molecular masses for which dispersants obtained solely by conventional radical polymerization do not result in good dispersing properties.

As regards the use of the polymers of the invention, they make it possible to give good fluidity to aqueous dispersions of mineral particles and more particularly to compositions based on hydraulic binders, such as cement. Another subject-matter of the present invention is composed of the use of the polymers of the invention as dispersants or plasticizers in compositions based on mineral particles and more particularly on hydraulic binders, such as cement.

The dispersing or plasticizing power of the polymers of the invention can be tested by preparing compositions based on mineral particles comprising the said plasticizer(s). One of these compositions is the cement mortar obtained by mixing cement, standard sand, water and the aqueous solution or dispersion comprising the dispersing polymers of the invention, optionally with the addition, for example, of antifoaming agents. Various types of tests can subsequently be carried out on these mortar compositions. Two types of measurements particularly relevant in characterizing the plasticizing power of the dispersants are used in the examples below, namely: the measurement of the initial spread of a cake of mortar additivated with dispersant and the measurement of the spread of a cake of mortar additivated with dispersant as a function of the time.

The measurement of the initial spread of a cake of mortar additivated with dispersant is described first. The mortar is prepared in the presence of the dispersant or plasticizer according to standard methods and a hollow truncated cone of well defined dimensions, known to a person skilled in the art as the Abrams minicone, is filled with the mortar; the cone has an opening for filling at the top and an opening for emptying at the bottom, and the mortar keeps to the inside owing to the fact that the cone is placed on a flat sheet which blocks the lower opening. Immediately after filling, the cone is raised from its support, which has the effect of bringing about the flow of the mortar, which empties over the flat sheet, spreading over the latter in the form of a round cake. The more fluid the mortar preparation, the more the mortar will spread and the greater will be the diameter of the cake. The maximum spread diameter of the cake, also known by persons skilled in the art as the slump or spread value, is a fairly reliable measurement of the fluidity of the preparation. This fluidity can be varied essentially by adjusting two parameters, which are the Water/Cement ratio (W/C ratio) of the mortar and the dosage of plasticizer, expressed as % of dispersant dry matter with respect to the cement (% SP). The greater the W/C ratio or the higher the % SP, the more fluid the mortar and thus the higher the value given by the measurement of spread diameter (or slump).

The measurement of the spread of a cake of mortar additivated with dispersant as a function of the time is now described. The above procedure makes it possible to determine the value of the initial spread (related to the fluidity of the mortar), that is to say immediately after filling the cone with the mortar for the first time. However, the spread mortar can be recovered and remixed according to a standard procedure and the spread measurement can be repeated at various times starting from the first spread or initial spread. The fluidity of the mortar can thus be monitored over a period generally ranging up to 2 or 3 hours. This measurement makes it possible to determine the behaviour of the additivated mortar in terms of change in the fluidity over time. It is often desirable for the fluidity to remain as high as possible for times which are as long as possible, up to the limit of 2 or 3 hours.

EXAMPLES

Example 1

According to the Invention, Copolymer by Controlled Radical Polymerization Initiated-Controlled by the Alkoxyamine MAMA 70 g of demineralized water, 5.70 g of alkoxyamine MAMA (Arkema) and 60 ml of a 0.4N sodium hydroxide solution are introduced into a 1 l glass reactor equipped with a variable-speed stirrer motor, inlets for the introduction of reactants, branch pipes for the introduction of inert gases which make it possible to drive off oxygen, such as nitrogen, measurement probes (e.g., for measuring temperature), a system for the condensation of vapours with reflux and a jacket which makes it possible to heat/cool the contents of the reactor by virtue of the circulation in the jacket of a heat-exchange fluid. The solution is degassed by bubbling nitrogen into the liquid. Furthermore, a mixture of 277.4 g of a 50% aqueous solution of methoxy polyethylene glycol methacrylate (PEG side chain with an $\overline{Mn}$ of 2080 g/mol) (Aldrich) and 11.5 g of methacrylic acid (Arkema) is prepared in an appropriate container and the mixture is degassed with nitrogen for 10 minutes.

The alkoxyamine solution in the reactor is then heated to 60° C. When the temperature of the reaction medium reaches 55° C., the mixture of monomers is then added over a period of 2 hours, which gives a temperature in the reactor during the addition of approximately 60° C. At the end of the addition, the temperature is maintained at 60° C. for an additional 4 hours and then the solution is cooled to ambient temperature. The final dry extract of the aqueous solution of dispersing copolymer thus obtained was measured by gravimetry at 35.65%. The conversion of the monomers to polymer is evaluated at 94% by weight by SEC. The molecular masses of the copolymer as PEG equivalent, determined by SEC, are 20 910 g/mol for the mass at the peak of the distribution (Mp), 19 780 for the number-average molecular mass ($\overline{Mn}$) and 35 940 for the weight-average molecular mass ($\overline{Mw}$).

For the measurement of the plasticizing power of the copolymer, a model mortar is prepared starting from 518.5 g of dry cement of Lumbres type (CEM I 42.5R) and 1350 g of standard sand (CEN EN 196-1), 279.99 g of demineralized water and 2.54 g of the aqueous solution of dispersing copolymer, additivated beforehand with 1% by weight with respect to the dry matter of an antifoaming agent (Clerol). The amounts employed see to it that the W/C ratio is thus fixed at 0.54 and the dosage of dispersant, % SP, at 0.175% with respect to the cement. The preparation of the mortar and the fluidity (spread or slump) measurements are carried out in a room in which the temperature is continuously regulated at 21° C. with a tolerance of plus or minus 2° C.

The mortar is prepared by first mixing the water and the dispersant solution. This mixture constitutes the mixing water, which is subsequently introduced into a mortar mixer. After the addition of the cement, the mixer is started up at 65 revolutions/minute for 30 seconds. After addition of the sand, the mixer is again started up at 65 revolutions/minute for 30 seconds. The mixture is mixed at 125 revolutions/minute for 30 seconds and left standing, subsequently, for 90 seconds. After this period of rest, mixing is again carried out at 125 revolutions/minute for a further 60 seconds. The mortar thus obtained makes it possible to fill the Abrams minicone, the weight and the dimensions of which are as follows: minimum weight 4 kg; diameter of the upper opening 50 mm, diameter of the lower opening 100 mm, height 150 mm. Before filling, the cone is placed on a 50×50 cm PVC sheet with a thickness of 1 cm moistened using a sponge. The cone is filled according to a well defined procedure consisting in filling in three steps with a third of the height of the cone filled each time and the entire height over a total period of time of 2 minutes. Furthermore, at the end of each third of filling, and in order to reduce the entrainment of air in the mortar, the contents of the cone are settled by rodding them using a metal rod with a length of 30 cm and a diameter of 5 mm. At the end of the 2 minutes, the filled cone is lifted up, which causes its contents to spread over the support sheet. 30 seconds after the cone has been lifted up, the spread measurement is taken by measuring the length of two perpendicular diameters of the cake. The mean of these two diameters is the measurement of initial spread of the mortar. For the measurements of fluidity of the mortar as a function of the time, the spread mortar is recovered, replaced in the mixer and left standing and well covered in order to prevent evaporation of the water. When the time arrives to carry out a further measurement, mixing is carried out at 125 revolutions/minute for 60 seconds. Subsequently, the cone is filled according to the cited procedure and the spread is again measured as indicated above for the initial spread.

The change in the spread as a function of the time for the mortar prepared with the dispersant in this example is shown in Table I; by way of comparison, this table also shows the performances of a mortar prepared under the same conditions and with the same W/C and % SP values starting from a commercial dispersant (Ecocryl 5930 from Cray Valley).

Example 2

According to the Invention; Copolymers Obtained by Controlled Radical Polymerization with Alkoxyamine MAMA and by Conventional Radical Polymerization with Ammonium Persulphate 120 g of demineralized water, 1.15 g of alkoxyamine MAMA (Arkema) and 12 ml of a 0.4N sodium hydroxide solution are introduced into a 1 l glass reactor equipped like that of Example 1. The solution is degassed by bubbling nitrogen into the liquid. Furthermore, a mixture of 277.4 g of a 50% aqueous solution of methoxy polyethylene glycol methacrylate (PEG side chain with an $\overline{Mn}$ of 2080 g/mol) (Aldrich) and 11.5 g of methacrylic acid (Arkema) is prepared in an appropriate container and the mixture is degassed with nitrogen for 10 minutes.

The alkoxyamine solution in the reactor is then heated to 60° C. When the temperature of the reaction medium reaches 60° C., the mixture of monomers is then added over a period of 2 hours. At the end of the addition, the temperature is maintained at 60° C. for an additional 4 hours and then the solution is cooled to ambient temperature. The dry extract of the aqueous solution of dispersing copolymer thus obtained was measured by gravimetry at 35.4%. The conversion of the monomers to polymer is evaluated at 69% by weight by SEC. The molecular masses of the copolymer obtained with the alkoxyamine MAMA as PEG equivalent, determined by SEC, are 29 760 g/mol for Mp, 29 110 g/mol for $\overline{Mn}$ and 56 120 g/mol for $\overline{Mw}$.

0.22 g of ammonium persulphate (Aldrich) is then added to convert the residual monomers. The reaction medium is heated at 75° C. for 4 hours and is then cooled to ambient temperature. The final dry extract of the aqueous solution of dispersing copolymer thus obtained was measured by gravimetry at 33.6%. The conversion was evaluated at 97% by weight by SEC. The overall molecular masses of the blend of copolymers which are obtained by Controlled and Conventional Radical Polymerization as PEG equivalent, determined by SEC, are 59 640 g/mol for Mp, 38 280 g/mol for $\overline{Mn}$ and 134 500 g/mol for $\overline{Mw}$.

The plasticizing power of the copolymer is measured by following the procedure described in Example 1 and by employing the same experimental conditions. The mortar is prepared starting from 518.5 g of dry cement of Lumbres type and 1350 g of standard sand (CEN EN 196-1), 279.99 g of demineralized water and 2.70 g of the aqueous solution of dispersing copolymer, additivated beforehand with 1% by weight with respect to the dry matter of an antifoaming agent (Clerol). The change in the spread as a function of the time for the mortar prepared with the dispersant of this example is shown in Table II; by way of comparison, this table also shows the performances of a mortar prepared under the same conditions and with the same values of W/C and % SP starting from a commercial dispersant (Ecocryl 5930 from Cray Valley).

Example 3

According to the Invention; Copolymers Obtained by Controlled Radical Polymerization with Alkoxyamine Mama and by Conventional Radical Polymerization with Ammonium Persulphate 120 g of demineralized water, 2.29 g of alkoxyamine MAMA (Arkema) and 24 ml of a 0.4N sodium hydroxide solution are introduced into a 1 l glass reactor equipped like that of Example 1. The solution is degassed by bubbling nitrogen into the liquid. Furthermore, a mixture of 277.4 g of a 50% aqueous solution of methoxy polyethylene glycol methacrylate (PEG side chain with an $\overline{Mn}$ of 2080 g/mol) (Aldrich) and 11.5 g of methacrylic acid (Arkema) is prepared in an appropriate container and the mixture is degassed with nitrogen for 10 minutes.

The alkoxyamine solution in the reactor is then heated to 60° C. When the temperature of the reaction medium reaches 60° C., the mixture of monomers is then added over a period of 2 hours. At the end of the addition, the temperature is maintained at 60° C. for an additional 4 hours and then the solution is cooled to ambient temperature. The dry extract of the aqueous solution of dispersing copolymer thus obtained was measured by gravimetry at 34.5%. The conversion of the monomers to polymer is evaluated at 67% by weight by SEC. The molecular masses of the copolymer obtained with the alkoxyamine MAMA as PEG equivalent, determined by SEC, are 16 630 g/mol for Mp, 15 990 g/mol for $\overline{Mn}$ and 21 310 g/mol for $\overline{Mw}$.

0.45 g of ammonium persulphate (Aldrich) is then added to convert the residual monomers. The reaction medium is heated at 75° C. for 4 hours and is then cooled to ambient temperature. The final dry extract of the aqueous solution of dispersing copolymer thus obtained was measured by gravimetry at 34.8%. The conversion was evaluated at 97% by weight by SEC. The overall molecular masses of the blend of copolymers which are obtained by Controlled and Conventional Radical Polymerization as PEG equivalent, determined by SEC, are 18 800 g/mol for Mp, 19 060 g/mol for $\overline{Mn}$ and 40 380 g/mol for $\overline{Mw}$.

The plasticizing power of the copolymer is measured by following the procedure described in Example 1 and by employing the same experimental conditions. The mortar is prepared starting from 518.5 g of dry cement of Lumbres type and 1350 g of standard sand (CEN EN 196-1), 279.99 g of demineralized water and 2.61 g of the aqueous solution of dispersing copolymer, additivated beforehand with 1% by weight with respect to the dry matter of an antifoaming agent (Clerol). The initial spread of the mortar obtained with the dispersant of this example was greater than 370 mm, which demonstrates a high plasticizing power.

Comparative Example 1

The Unconverted Fraction of Monomers is Too High 123 g of demineralized water, 3.45 g of alkoxyamine MAMA (Arkema), 36 ml of a 0.4N sodium hydroxide solution, 416 g of a 50% aqueous solution of polyethylene glycol methacrylate (PEG side chain with an $\overline{Mn}$ of 2080 g/mol) (Aldrich) and 17.2 g of methacrylic acid (Arkema) are introduced into a 1 l glass reactor equipped like that of Example 1. The solution is degassed with nitrogen for 10 minutes and then heated to 85° C. The temperature is maintained at 85° C. for 7 hours and then the solution is cooled to ambient temperature. The dry extract of the aqueous solution of dispersing copolymer thus obtained was measured by gravimetry at 36.71%. The conversion of the monomers to polymer is evaluated at 82% by weight by SEC. The molecular masses of the copolymer obtained with the alkoxyamine MAMA as PEG equivalent, determined by SEC, are 12 370 g/mol for Mp, 12 710 g/mol for $\overline{Mn}$ and 20 670 g/mol for $\overline{Mw}$.

The plasticizing power of the copolymer is measured by following the procedure described in Example 1 and by employing the same experimental conditions. The mortar is prepared starting from 518.5 g of dry cement of Lumbres type and 1350 g of standard sand (CEN EN 196-1), 279.99 g of demineralized water and 2.47 g of the aqueous solution of dispersing copolymer, additivated beforehand with 1% by weight with respect to the dry matter of an antifoaming agent (Clerol). The change in the spread as a function of the time for the mortar prepared with the dispersant of this example is shown in Table III; these performances are to be compared with those of the mortars of Tables I and II.

Comparative Example 2

The Unconverted Fraction of Monomers is Too High 150 g of demineralized water, 0.86 g of alkoxyamine MAMA (Arkema), 9 ml of a 0.4N sodium hydroxide solution, 416 g of a 50% aqueous solution of polyethylene glycol methacrylate (PEG side chain with an $\overline{Mn}$ of 2080 g/mol) (Aldrich) and 17.2 g of methacrylic acid (Arkema) are introduced into a 1 l glass reactor equipped like that of Example 1. The solution is degassed with nitrogen for 10 minutes and then heated to 85° C. The temperature is maintained at 85° C. for 7 hours and then the solution is cooled to ambient temperature. The dry extract of the aqueous solution of dispersing copolymer thus obtained was measured by gravimetry at 36.06%. The conversion of the monomers to polymer is evaluated at 63% by weight by SEC. The molecular masses of the copolymer obtained with the alkoxyamine MAMA as PEG equivalent, determined by SEC, are 53 670 g/mol for Mp, 43 170 g/mol for $\overline{Mn}$ and 117 900 g/mol for $\overline{Mw}$.

The plasticizing power of the copolymer is measured by following the procedure described in Example 1 and by employing the same experimental conditions. The mortar is prepared starting from 518.5 g of dry cement of Lumbres type and 1350 g of standard sand (CEN EN 196-1), 279.99 g of demineralized water and 2.51 g of the aqueous solution of dispersing copolymer, additivated beforehand with 1% by weight with respect to the dry matter of an antifoaming agent (Clerol). The change in the spread as a function of the time for the mortar prepared with the dispersant of this example is shown in Table III; these performances are to be compared with those of the mortars of Tables I and II.

TABLE I

| Dispersant | Time (min) | Spread (mm) |
|---|---|---|
| Commercial reference Ecocryl 5930 | 0 | 296 |
| | 30 | 290 |
| | 60 | 286 |
| | 90 | 274 |
| | 120 | 263 |
| Dispersant of Example 1 | 0 | 327 |
| | 30 | 313 |
| | 60 | 310 |
| | 90 | 308 |
| | 120 | 289 |

TABLE II

| Dispersant | Time (min) | Spread (mm) |
|---|---|---|
| Commercial reference Ecocryl 5930 | 0 | 283 |
| | 30 | 277 |
| | 60 | 270 |
| | 90 | 263 |
| | 120 | 253 |
| Dispersant of Example 2 | 0 | 332 |
| | 30 | 320 |
| | 60 | 322 |
| | 90 | 312 |
| | 120 | 303 |

TABLE III

| Dispersant | Time (min) | Spread (mm) |
|---|---|---|
| Dispersant of Counterexample 1 | 0 | 238 |
| | 30 | 227 |
| | 60 | 213 |
| | 90 | 207 |
| | 120 | 197 |
| Dispersant of Counterexample 2 | 0 | 246 |
| | 30 | 238 |
| | 60 | 222 |
| | 90 | 215 |
| | 120 | 212 |

The invention claimed:

1. A process for the preparation in aqueous solution of water-soluble acrylic polymers or for the preparation in aqueous dispersion of water-dispersible acrylic polymers, comprising
    a) copolymerising, the total of the comonomers being 100 mol %:
        1) 5 to 70 mol % of one or more monomer(s) (A) which are (alkoxy)polyalkylene glycol (meth)acrylates and/or ((alkoxy)polyalkylene glycol)(meth)acrylamides;
        2) 5 to 95 mol % of one or more unsaturated carboxylic monomer(s) (B); and
        3) 0 to 85 mol % of one or more hydrophobic monomer(s) (C) which are water insoluble;
    in the absence of a chain-transfer agent, in the absence of conventional radical initiators, and in the presence of a sufficient amount of a water-soluble alkoxyamine;
    b) terminating the water-soluble alkoxyamine present at a point after the conversion of at least 50% by weight of the monomers (A), (B) and (C) is obtained, but on or before 69% conversion by weight of the monomers (A), (B) and (C);
    c) continuing the polymerisation in the presence of a conventional radical initiator, optionally in the presence of a chain-transfer agent, until a conversion of at least 90% by weight of the monomers (A), (B) and (C) is obtained.

2. The process according to claim 1, in which the conversion by weight of the monomers (A), (B) and (C) in the presence of alkoxyamine is at least 60% by weight.

3. The process according to claim 1, in which the proportions of the monomers are:
    5 to 50 mol % of monomer(s) (A),
    20 to 95 mol % of monomer(s) (B),
    0 to 65 mol % of monomer(s) (C).

4. The process according to claim 1, in which, in (A), the average molecular mass $\overline{Mn}$ of the polyalkylene glycol side chain is between 350 and 10,000 g/mol.

5. The process according to claim 4, in which the average molecular mass $\overline{Mn}$ of the polyalkylene glycol side chain is between 1000 and 6000 g/mol.

6. The process according to claim 1, in which (A) is selected from the group consisting of methoxypolyethylene glycol acrylate and methoxypolyethylene glycol methacrylate with a polyethylene glycol side chain with a number-average molar mass of between 900 g/mol and 5100 g/mol.

7. The process according to claim 6, in which the number-average molar mass is between 1800 g/mol and 2200 g/mol.

8. The process according to claim 1, in which (B) is chosen from acrylic acid and methacrylic acid.

9. The process according to claim 1, in which (C) is chosen from alkyl methacrylates.

10. The process according to claim 1, in which the alkoxyamine is chosen from 2-methyl-2-[N-tert-butyl-N-(diethoxy-phosphoryl-2,2-dimethylpropyl)aminoxy]propionic acid and its metal and ammoniacal salts.

11. The process of claim 1 further comprising diluting said solution or dispersion.

12. The process of claim 1 further comprising drying said solution or dispersion to obtain a powder.

13. An aqueous solution or dispersion of respectively water-soluble or water-dispersible acrylic polymer comprising, the total of the comonomers being 100 mol %:
    a) 5 to 70 mol % of one or more monomer(s) (A) which are (alkoxy)polyalkylene glycol (meth)acrylates and/or ((alkoxy)polyalkylene glycol)(meth)acrylamides;
    b) 5 to 95 mol % of one or more unsaturated carboxylic monomer(s) (B); and
    c) 0 to 85 mol % of one or more hydrophobic monomer(s) (C) which are water insoluble;
said polymer having an $\overline{Mn}$ of between 10,000 g/mol and 50,000 g/mol, wherein said polymer comprises residues of a water-soluble alkoxyamine on 50-69 weight percent of polymer chain ends, and conventional radical initiator residues on 31-50 weight percent of polymer chain ends.

14. The aqueous solution or dispersion according to claim 13, in which the polymer has a polydispersity index $\overline{Mw}/\overline{Mn}<2$.

15. The aqueous solution or dispersion of claim 13, wherein said polymer having a polydispersity index $\overline{Mw}/\overline{Mn}<6$ and an $\overline{Mw}$ of between 10,000 g/mol and 500,000 g/mol.

16. The solution or dispersion according to claim 15, wherein the polymer has a polydispersity index $\overline{Mw}/\overline{Mn}<5$.

17. The solution or dispersion according to claim 15, wherein the polymer has a polydispersity index $\overline{Mw}/\overline{Mn}<4$.

18. The solution or dispersion according to claim 15, wherein $\overline{Mw}$ is between 30,000 g/mol and 150,000 g/mol.

19. The solution or dispersion according to claim 13, wherein the proportions of the monomers are:

5 to 50 mol % of monomer(s) (A),
20 to 95 mol % of monomer(s) (B),
0 to 65 mol % of monomer(s) (C).

20. The solution or dispersion according claim 13, wherein, in (A), the average molecular mass $\overline{Mn}$ of the polyalkylene glycol side chain is between 350 and 10,000 g/mol.

21. The solution or dispersion according to claim 20, wherein the average molecular mass $\overline{Mn}$ of the polyalkylene glycol side chain is between 1000 and 6000 g/mol.

22. The solution or dispersion according to claim 13, wherein (A) is chosen from methoxypolyethylene glycol acrylate and methoxypolyethylene glycol methacrylate with a polyethylene glycol side chain with a number-average molar mass of between 900 g/mol and 5100 g/mol.

23. The solution or dispersion according to claim 22, wherein the polyethylene glycol side chain number-average molar mass is between 1800 g/mol and 2200 g/mol.

24. The solution or dispersion according to claim 13, wherein (B) is chosen from acrylic acid and methacrylic acid.

25. The solution or dispersion according to claim 13, in which (C) is chosen from alkyl methacrylates.

26. A composition comprising the aqueous solution or dispersion of claim 13, and further comprising: mineral particles.

27. The composition of claim 26, wherein said mineral particles comprise a cement-based composition.

28. The composition of claim 27, wherein said cement-based composition comprises a cement grout, mortar, or concrete.

29. The composition of claim 26 further comprising at least one other polymer.

30. A composition comprising the aqueous solution or dispersion of claim 13, wherein said composition comprises a cosmetic composition, a ceramic composition, or a paint composition.

31. The composition of claim 30, further comprising at least one other polymer.

32. The aqueous solution or dispersion of claim 13, wherein the alkoxyamine is selected from the group consisting of 2-methyl-2-[N-tert-butyl-N-(diethoxy-phosphoryl-2,2-dimethylpropyl)aminoxy]propionic acid and its metal and ammoniacal salts.

* * * * *